United States Patent
Yoon et al.

(10) Patent No.: US 7,715,787 B2
(45) Date of Patent: May 11, 2010

(54) METHOD OF COOPERATIVELY RELAYING DATA IN CELLULAR NETWORKS FOR A BROADCAST MULTICAST SERVICES

(75) Inventors: Young Cheul Yoon, San Diego, CA (US); Sang Gook Kim, San Diego, CA (US); Li-Hsiang Sun, San Diego, CA (US); Byung Kwan Yi, San Diego, CA (US); Woo Hyun Paik, San Diego, CA (US)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 11/536,543

(22) Filed: Sep. 28, 2006

(65) Prior Publication Data

US 2007/0070953 A1   Mar. 29, 2007

Related U.S. Application Data

(60) Provisional application No. 60/721,656, filed on Sep. 28, 2005.

(51) Int. Cl.
*H04B 7/185* (2006.01)
*H04B 7/14* (2006.01)

(52) U.S. Cl. .................. 455/13.1; 455/7; 455/13.2; 455/16; 370/315; 370/226; 370/243; 370/244; 370/247

(58) Field of Classification Search ............. 370/315, 370/336, 226, 243, 244, 247, 275, 280, 294, 370/502; 455/7, 13.1, 13.2, 16
See application file for complete search history.

(56) References Cited

U.S. PATENT DOCUMENTS

| | | | | |
|---|---|---|---|---|
| 4,490,818 A | * | 12/1984 | Otsuka ........................ | 370/279 |
| 4,653,070 A | * | 3/1987 | Nakajima et al. ........... | 714/800 |
| 4,905,302 A | * | 2/1990 | Childress et al. ............ | 455/515 |
| 5,495,508 A | * | 2/1996 | Kaewell et al. .............. | 375/356 |
| 5,515,379 A | * | 5/1996 | Crisler et al. ................ | 370/347 |

(Continued)

FOREIGN PATENT DOCUMENTS

WO    WO 02/078210    10/2002

(Continued)

OTHER PUBLICATIONS

Ochiai, H. et al. "Design and Analysis of collaborative diversity protocols for wireless sensor networks." Proc. IEEE Veh. Technol. Conf.—Fall, Los Angeles, CA, Sep. 2004.

(Continued)

*Primary Examiner*—Huy Phan
*Assistant Examiner*—Chhean Thao
(74) *Attorney, Agent, or Firm*—Lee, Hong, Dergerman, Kang & Waimey

(57) ABSTRACT

A method of transmitting subpackets in a mobile communication system using at least one frequency carrier is disclosed. More specifically, the method comprises receiving a first broadcast subpacket from a base station (BS) at a first time slot on a first frequency carrier, and receiving at least one subsequent broadcast subpacket from the BS via at least one relay station (RS) at a second time slot on a second frequency carrier, wherein information of the first broadcast subpacket and the subsequent broadcast subpacket are the same.

14 Claims, 5 Drawing Sheets

Two carriers, two hops (one RS)

U.S. PATENT DOCUMENTS

| | | | | |
|---|---|---|---|---|
| 5,883,884 | A * | 3/1999 | Atkinson | 370/279 |
| 5,930,240 | A * | 7/1999 | Wichman | 370/315 |
| 5,943,326 | A * | 8/1999 | Schroderus | 370/324 |
| 6,115,369 | A * | 9/2000 | Oura | 370/337 |
| 6,373,833 | B1 * | 4/2002 | Suonvieri et al. | 370/347 |
| 6,473,617 | B1 * | 10/2002 | Larsen et al. | 455/446 |
| 7,363,039 | B2 * | 4/2008 | Laroia et al. | 455/448 |
| 7,428,268 | B2 * | 9/2008 | Shen et al. | 375/267 |
| 2002/0172162 | A1 | 11/2002 | Goodings | |
| 2003/0014709 | A1 * | 1/2003 | Miyoshi et al. | 714/758 |
| 2003/0133497 | A1 * | 7/2003 | Kinjo et al. | 375/152 |
| 2004/0266338 | A1 * | 12/2004 | Rowitch | 455/7 |
| 2005/0190849 | A1 * | 9/2005 | McNamara | 375/267 |
| 2006/0105709 | A1 * | 5/2006 | Oh et al. | 455/13.1 |
| 2006/0115015 | A1 * | 6/2006 | Oh et al. | 375/267 |
| 2007/0036071 | A1 * | 2/2007 | Herdin | 370/210 |
| 2007/0066220 | A1 * | 3/2007 | Proctor et al. | 455/11.1 |
| 2008/0260000 | A1 * | 10/2008 | Periyalwar et al. | 375/133 |
| 2008/0274692 | A1 * | 11/2008 | Larsson | 455/24 |
| 2009/0036051 | A1 * | 2/2009 | Horiuchi et al. | 455/7 |

FOREIGN PATENT DOCUMENTS

| | | |
|---|---|---|
| WO | WO 03/003672 | 1/2003 |
| WO | WO 2005/064872 | 7/2005 |

OTHER PUBLICATIONS

Barbarossa, et al. "Distributed space-time coding for multihop networks." 2004 IEEE International Conference on Communications, Jun. 2004.

Laneman, et al. "Distributed space0time0coded protocols for exploiting cooperative diversity in wireless networks." IEEE Transactions on Information Theory, Oct. 2003.

Miyano, et al. "Space time coded cooperative relaying technique for multihop communications." IEEE Vehicular Conference, 2004.

* cited by examiner

Two carriers, two hops (one RS)

Two carriers, two hops (one RS)
With space-time coding

Single carrier (TDM), two hops

Single carrier, two hops (one RS)

METHOD OF COOPERATIVELY RELAYING DATA IN CELLULAR NETWORKS FOR A BROADCAST MULTICAST SERVICES

This application claims the benefit of U.S. Provisional Application No. 60/721,656, filed on Sep. 28, 2005, which is hereby incorporated by reference.

BACKGROUND OF THE INVENTION

1. Field of the Invention

The present invention relates to a method of relaying data, and more particularly, to a method of cooperatively relaying data in cellular networks for Broadcast Multicast Services (BCMCS). Although the present invention is suitable for a wide scope of applications, it is particularly suitable for relaying data in cellular networks.

2. Discussion of the Related Art

A Broadcast Multicast Service (BCMCS) provides the ability to transmit the same information stream to multiple users simultaneously. More specifically, the BCMCS is intended to provide flexible and efficient mechanism to send common or same information to multiple users. The motivation for this service is to achieve the most efficient use of air interface and network resources when sending the same information to multiple users. The type of information transmitted can be any type of data (e.g., video, text, multimedia, streaming media). The BCMCS is delivered via the most efficient transmission technique based on the density of the BCMCS users, information (media type) being transmitted, and available wireless resources.

Transmission territory for each BCMCS program can be independently defined. Here, the BCMCS program refers to a logical content transmitted using the BCMCS capabilities. Moreover, the BCMCS program is composed of one or more internet protocol flows. In operation, the programs can be transmitted in time sequence on a given channel. The BCMCS programs can be transmitted to all or selected regions of the network. These regions constitute the transmission territory which refers to an area of wireless network coverage where transmission of a BCMCS program can occur. The transmission territory can be defined by a set of cells/sectors that can transmit a BCMCS program. In addition, the BCMCS programs can be received by all users or can be restricted to a subset of users via encryption.

In the BCMCS, retransmission and acknowledgement are not required since the type of transmission is "one way" and/or "one to many."

The BCMCS subscription is normally associated with the program (e.g., ABC, TNT, ESPN), not the content (media type such as music, video, etc.). That is, by selecting the program, the user selects the type of content the user wishes to receive.

The BCMCS in cellular networks typically incur coverage holes and limited capacity (channels) per carrier. This can arise due to channel propagation impairments (e.g., severe shadowing), large cell sizes (e.g., with site-to-site distances greater than 2 km) due to base terminal station (BTS) deployments, limited bandwidth, and interference from adjacent cells transmitting different BCMCS content. Consequently, BCMCS coverage becomes limited along with broadcast multicast system capacity.

SUMMARY OF THE INVENTION

Accordingly, the present invention is directed to a method of cooperatively relaying data in cellular networks for a Broadcast Multicast Services (BCMCS) that substantially obviates one or more problems due to limitations and disadvantages of the related art.

An object of the present invention is to provide a method of receiving subpackets in a mobile communication system using at least one frequency carrier.

Another object of the present invention is to provide a method of receiving subpackets in a mobile communication system using a single frequency carrier.

A further object of the present invention is to provide a method of transmitting subpackets in a mobile communication system using at least one frequency carrier.

Yet, another object of the present invention is to provide a method of transmitting subpackets in a mobile communication system using a single frequency carrier.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving subpackets in a mobile communication system using at least one frequency carriers includes receiving a first broadcast subpacket from a base station (BS) at a first time slot on a first frequency carrier and receiving at least one subsequent broadcast subpacket from the BS via at least one relay station (RS) at a second time slot on a second frequency carrier, wherein information of the first broadcast subpacket and the subsequent broadcast subpacket are the same.

In another aspect of the present invention, a method of receiving subpackets in a mobile communication system using a single frequency carrier includes receiving a first broadcast subpacket from a base station (BS) at a first time slot and receiving at least one subsequent broadcast subpacket from the BS via at least one relay station (RS) and the BS at a second time slot, wherein information of the first broadcast subpacket and the subsequent broadcast subpacket are same and wherein the at least one subsequent broadcast subpacket is received on the single frequency carrier.

In a further aspect of the present invention, a method of transmitting subpackets in a mobile communication system using at least one frequency carriers transmitting a first broadcast subpacket to a mobile station (MS) at a first time slot on a first frequency carrier and transmitting at least one subsequent broadcast subpacket to the MS via at least one relay station (RS) at a second time slot on a second frequency carrier, wherein information of the first broadcast subpacket and the subsequent broadcast subpacket are the same.

Yet, in another aspect of the present invention, a method of transmitting subpackets in a mobile communication system using a single frequency carrier transmitting a first broadcast subpacket to a mobile station (MS) at a first time slot and transmitting at least one subsequent broadcast subpacket to the MS via at least one relay station (RS) and the MS at a second time slot, wherein information of the first broadcast subpacket and the subsequent broadcast subpacket are same and wherein the at least one subsequent broadcast subpacket is transmitted on the single frequency carrier.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
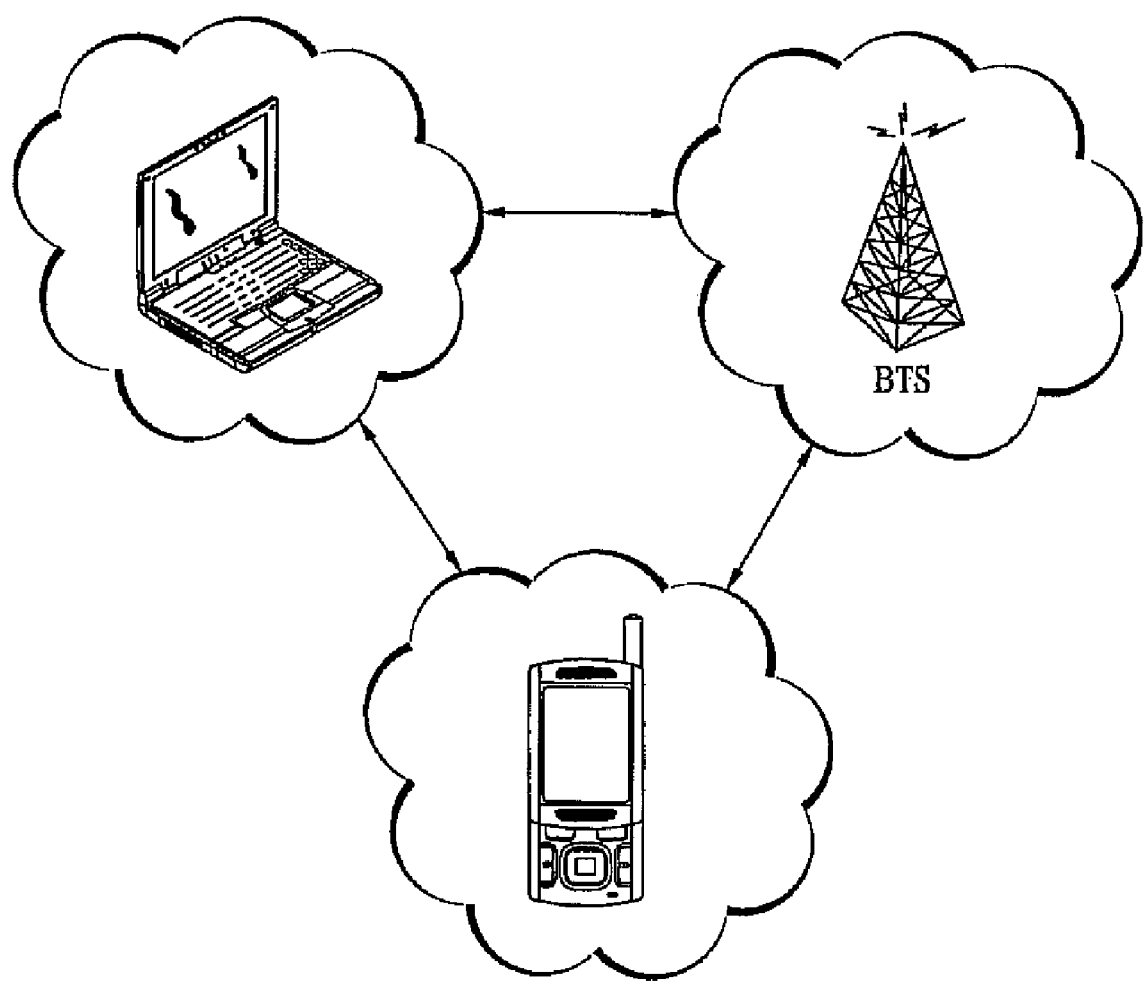
FIG. 1 illustrates a plurality of modules that are respectively one hop apart.

Reference will now be made in detail to the preferred embodiments of the present invention, examples of which are illustrated in the accompanying drawings. Wherever possible, the same reference numbers will be used throughout the drawings to refer to the same or like parts.

In a wireless mobile communication system that supports the BCMCS, multimedia data such as audio and video is transmitted at a high data rate to mobile stations located in the broadcast area. In order to perform BCMCS, a packet data channel of a physical (PHY) layer has to be able to support high data rate. In the current wireless mobile communication system, the BCMCS data is transmitted on the existing packet data channel of the PHY layer.

With respect to the BCMCS, the broadcast contents generated from the BTS and/or contents delivered from other BTS are transmitted to a plurality of mobile stations in the BTS cell/sector. Before the contents using the BCMCS can be transmitted, the BTS and the MS share a same protocol.

Although the BCMCS data is transmitted on the packet data channel, since the BCMCS uses a transmission scheme where a BTS transmits to a plurality of mobile stations, there is no independent received signal quality feedback from each MS. For example, even if there is error in the received subpacket, the MS does not need to send an acknowledgment (ACK) or a negative ACK (NACK) signals to the BTS.

Furthermore, the BTS performing the BCMCS seeks to make all the mobile stations in the BTS cell/sector receive the data having a certain level of quality by determining the data transmission rate. The data transmission rate can be determined based on payload size, a number of sub-packets for a Hybrid Automatic Repeat Request (HARQ) scheme, modulation scheme, and a like.

As mentioned above, since the BCMCS service does not need to send feedback from the receiving end, the BTS cannot modify data transmission rate according to the channel environment and sends the subpacket at a fixed rate to all the mobile stations in the cell/sector. Furthermore, each BTS can set the data rate where a packet error rate (PER) value is lower than the standard value or some percentage (e.g., 90%) for all the mobile stations in the cell/sector. The subpacket is then sent at the fixed or set data rate.

The BCMCS includes various functions. A subscription management function supports the capability to subscribe a user for broadcast/multicast service. After the MS is subscribed to the system, a service discovery function can be used to discover the BCMCS program. That is, the service discovery function refers to the procedure a mobile station (MS) employs to discover the BCMCS programs that can be provided by the system. For example, an announcement of a BCMCS program can be automatically sent to the BCMCS capable MS (e.g., a background light blinking a specified number of times whenever a MS enters a broadcast range or whenever a broadcast program commences).

During operation, an information acquisition function allows the user to acquire the information needed to receive a BCMCS program. Furthermore, a distribution management function provides the system the ability to determine the locations where the BCMCS program is transmitted. As another service function, a radio management function deals with efficient operation of the radio channels to support the BCMCS. Also, a service accounting function includes aspects of the service related to billing based on the services rendered. Lastly, a feature interaction function relates to the aspects of initiating and operating the BCMCS service simultaneously with other services.

Currently, the BCMCS over cellular networks are based on single-hop networks. The single hop network refers to a network where all entities/modules are a maximum of one hop apart. FIG. 1 illustrates a plurality of modules that are respectively one hop apart. In FIG. 1, two MSs and a base terminal station (BTS) are one hop apart, respectively.

In the conventional BCMCS environment where the modules are more than one hop apart, as discussed above, the conventional BCMCS in cellular networks can experience problems in providing uniform service throughout the coverage area due to obstacles, large coverage area, and a like.

To improve service throughout the coverage area as well as capacity, multiple hops (two or more hops) can be used. More specifically, two or more hops through relaying can be employed to provide more consistent service and improved capacity. To this end, a relay station (RS) can be introduced in the network.

Figure 2:
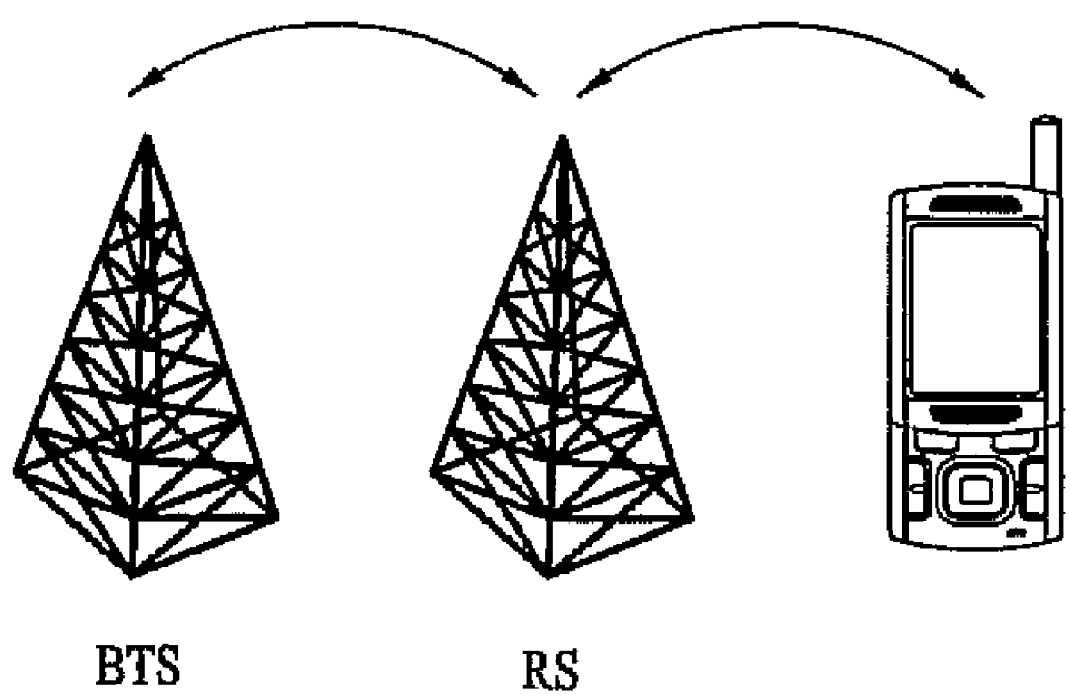
FIG. 2 is a diagram illustrating an example of a relay station (RS) in a multi-hop system.

FIG. 2 is a diagram illustrating an example of a RS in a multi-hop system. As shown in FIG. 2, the RS is placed between the BTS and the MS. The function of the RS is to 'repeat' the BTS signal in a trivial or a smart manner so as to extend the BCMCS coverage. According to the conventional system, the MSs positioned away from the BTS (e.g., near the cell border) often experience failed signal (e.g., packet decoding error) due to weakened signal strength or interference due to signals from neighboring cells/sectors. With the extended BCMCS coverage, however, the MS's, that would otherwise be unable to receive strong enough signal, can demodulate and decode the BCMCS signal.

As mentioned above, the function of the RS can be accomplished in a trivial or smart manner, for example. The trivial manner refers to relaying the signal through simple signal repetition. Alternatively, the smart manner refers to employing space-time coding to achieve transmit diversity or incremental redundancy (IR).

To have a successful relayed BCMCS, there are several schemes available.

Figure 3:
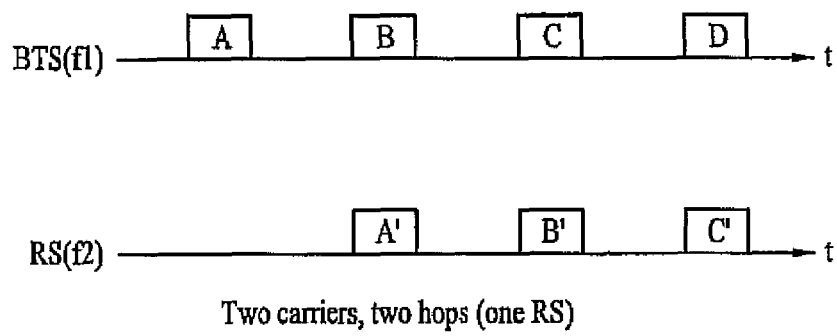
FIG. 3 illustrates a scheme for a relayed BCMCS according to an embodiment of the present invention.

FIG. 3 illustrates a scheme for a relayed BCMCS according to an embodiment of the present invention. The scheme of FIG. 3 can be construed as being similar to 'frequency division multiplexing' in that multiple carrier frequencies are used. That is, availability of two or more carrier frequencies is assumed.

In FIG. 3, a multi-hop system is illustrated having two frequency carriers, represented by f1 and f2, and one RS, From the BTS, the original signals in form of BCMCS packets (e.g., A, B, C, D) are broadcasted in sequence through a frequency (i.e., f1). The sequentially transmitted BCMCS packets are received by the MS and the RS. The RS received BCMCS packets are then decoded. As illustrated in this figure, the RS first receives and decodes subpacket A broadcasted from the BTS. Thereafter, the RS transmits a 'relayed signal' A' which can be a simple repetition of the originally transmitted subpacket A or alternatively, an encoded version of subpacket A (e.g., transmitted with systematic bits but possibly different parity bits).

In this embodiment and other embodiments to follow, the RS serves various functions. For example, the RS can receive, decode, and/or transmit the subpackets. That is, in transmitting the subpackets, the RS can "amplify and forward" and/or "decode and forward." The transmitted signal typically includes noise. In the former, the received signal is amplified and transmitted. In the latter, the received signal is first decoded. If the decoding is successful, then the originally transmitted signal from the BTS can be re-constructed and transmitted. This transmitted signal typically has no noise. In addition, the RS requires a certain minimum amount of time to decode the received packet before it can be transmitted (relayed) to the MS. As such, the timing of the relayed transmissions from the RS can be altered.

Furthermore, the RS can be equipped with multiple antennas to achieve transmit diversity. A multi-input, multi-output (MIMO) can provide transmit diversity to increase efficiency of wireless resources. The use of multiple antennas provides the RS and other terminals (e.g., mobile station) to achieve diversity gain without increase in bandwidth. For example space-time code (STC) can be used to increase reliability of communication links, spatial multiplexing (SM) can be used to increase transmission capacity, or a full diversity full rate space time code (FDFR-STC) can be used to achieve full diversity.

Figure 4:
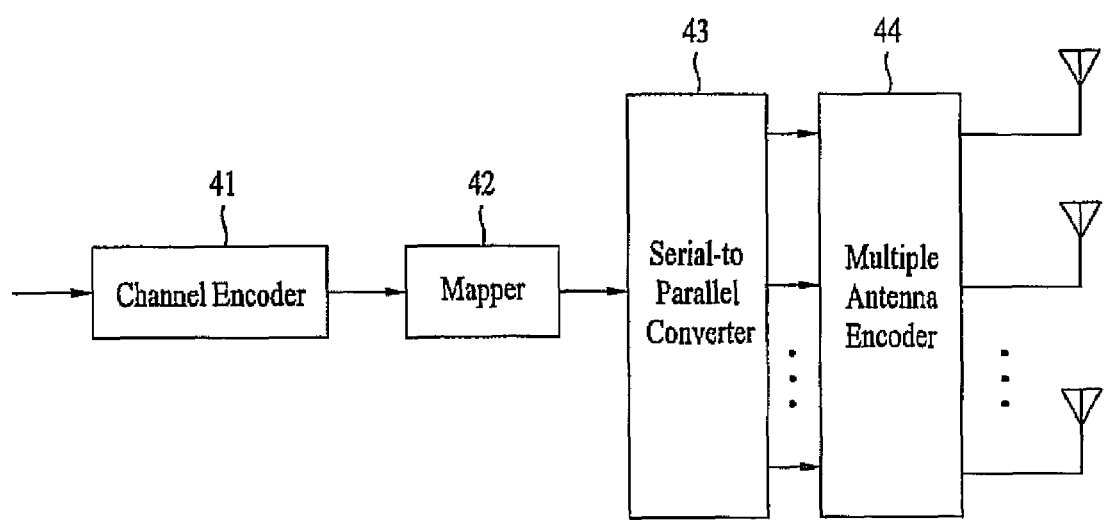
FIG. 4 illustrates an example of a transmitting end having multiple antennas.

FIG. 4 illustrates an example of a transmitting end having multiple antennas. In FIG. 4, a channel encoder 41 performs channel encoding operation according to a fixed algorithm on inputted data bits. When performing channel encoding operation, redundancy bits are added to generate robust signal to better withstand noise. A mapper 42 performs constellation mapping to convert the channel encoded bits to symbols. Furthermore, a serial-to-parallel converter 43 converts symbols outputted from the mapper 42 to parallel symbols so that the symbols can be transmitted via the multiple antennas. In addition, a multiple antenna encoder 44 converts the channel symbols inputted in parallel to multiple antenna symbols and then transmits.

Figure 5:
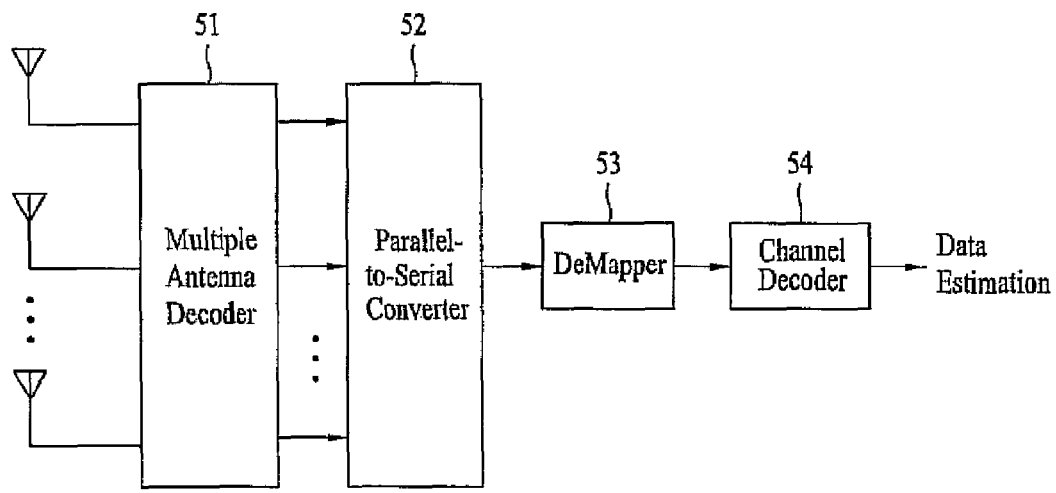
FIG. 5 is an example of a receiving end having multiple antennas.

FIG. 5 is an example of a receiving end having multiple antennas. In FIG. 5, the multiple antenna decoder 51 receives the multiple antenna symbols and converts them to channel symbols. A parallel-to-serial converter 52 converts the channel symbols inputted in parallel to serial channel symbols. A demapper 53 performs constellation demapping to convert the inputted channel symbols to bits. Thereafter, a channel decoder 54 performs decoding operation on bits received from the demapper 53.

If multiple encoding is performed, diversity gain of multiple antennas can vary based on which encoding scheme is employed. Therefore, it is necessary to have an encoding matrix which can provide full diversity and full rate space time coding.

As discussed above, the MIMO scheme can be used to increase transmission capacity in a wireless communication system. An Alamouti space-time coding uses multiple antennas in the transmitting end and possibly multiple antennas in the receiving end to overcome fading in wireless channels. More specifically, the Alamouti scheme introduces two transmitting antennas which achieves diversity gain by using a multiple number of transmitting antennas and possibly a multiple number of receiving antennas (for details of Alamouti scheme, see Alamouti, S. M. *A Simple Transmit Diversity Technique for Wireless Communications*, IEEE Journal on Select Areas in Communications, Vol. 16, No. 8, (October 1998), pp. 1453-1458)

Figure 6:
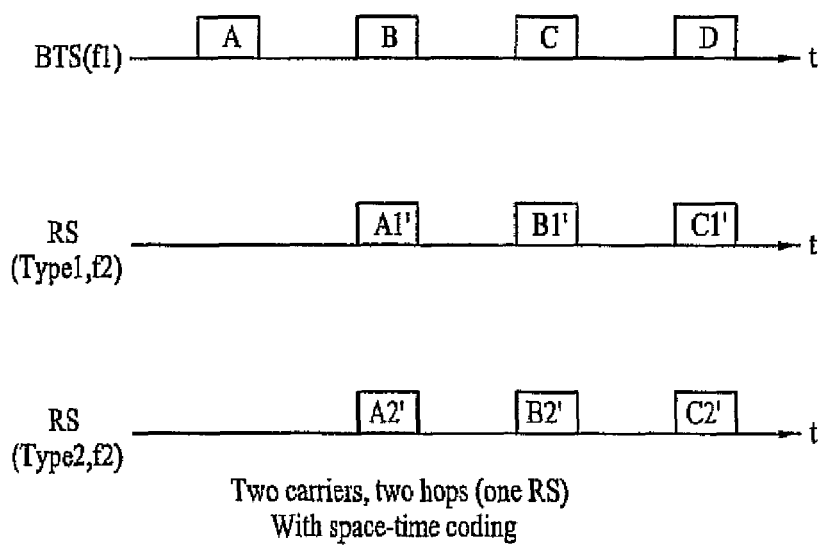
FIG. 6 illustrates a scheme for a relayed BCMCS according to another embodiment of the present invention.

The transmission of subpacket A' to the MS can be made on a different frequency (i.e., f2). An important feature to note is that transmission of subpacket A' need not be time aligned with transmission of subpacket A. As shown in FIG. 6, subpacket A is first broadcasted on f1 by the BTS. The RS receives and decodes subpacket A and transmits subpacket A' (repetition or encoded version of subpacket A, for example) to the MS in the next transmission time slot. At the same transmission time slot, the BTS also broadcasts packet B which in turn is received and decoded by the RS before being transmitted during the subsequent transmission time slot to the MS. Subsequently, packets C and D are broadcasted on f1 and packet B' and C' are transmitted to the MS on f2 during the same transmission time slots, respectively. Here, the original packet and the relayed packets are transmitted at different transmission time slots. With this arrangement, not only can information contained in the packets be received with more accuracy, interferences can be reduced as well.

Further, a mechanism can be used to maintain timing of the RS (e.g., GPS). Here, the timing can be derived from the BTS signal, similar to the MS in which timing is derived from the BTS in a single hop system.

FIG. 6 illustrates a scheme for a relayed BCMCS according to another embodiment of the present invention. In FIG. 6, a space-time coding is introduced in a multi-hop system having two frequency carriers (i.e., f1 and f2) and two hops and two types of RS.

Similar to FIG. 3, the BTS broadcasts BCMCS packets (e.g., A, B, C, D) in sequence on a frequency (i.e., f1). The RS then receives the broadcasted BCMCS packets and decodes them before transmitting a 'relayed signal' to the MS. That is, for example, after the RS receives subpacket A broadcasted from the BTS on f1 and decodes subpacket A, the RS can then transmit subpacket A1' and subpacket A2' (also referred to as 'relayed signals') to the MS using a different frequency (i.e., f2). The relayed signals can be based on simple repetition or space-time encoding, for example. For simple repetition, subpackets A1' and A2' would simply relay the original signal subpacket A. Alternatively, space-time coding can be used to exploit transmit diversity. For example, sub-packets A1' and A2' can be a second-order space-time code such as the Alamouti code.

For transmit diversity, in FIG. 6, the BCMCS packets transmitted to the MS by the RS are divided into two types—Type 1 and Type 2. Here, the RS can be divided into two types (i.e., Type 1 and Type 2) based on the RS sharing one frequency and/or based on the RS having two antennas. However, the RS is not limited to having two antennas but can have more than two antennas. As discussed above, the RS decodes the BTS' transmission of subpacket A and transmits the 'relayed signals' A1' and A2' for RS of Type 1 and RS of Type 2, respectively. For example, the RS Type 1 transmits the same signal or repeated packet (e.g., subpacket A') such that subpacket A=subpacket A1'. At the same time, the RS Type 2 transmits a space-time encoded version, subpacket A2', instead to provide transmit diversity. Here, the space-time code can be based on an Alamouti scheme, for example (for details of Alamouti scheme, see Alamouti, S. M. *A Simple transmit Diversity Technique for Wireless Communications*, IEEE Journal on Select Areas in Communications, Vol. 16, No. 8, (October 1998), pp. 1453-1458). Since subpacket A1' and subpacket A2' are sent on the same frequency (i.e., f2) at the same transmission time slot, the relayed signal for Type 1 and Type 2 should be in a different format. That is, if Type 1 is a simple repetition of the original packet, then Type 2 is space-time encoded, and vice versa.

Further, the RS(s) can transmit relayed signal A' (e.g., subpacket A1' and subpacket A2') which can be a simple repetition of the originally transmitted subpacket A or an encoded version of subpacket A. The encoded version includes space time coding as well as incremental redundancy which uses different parity bits than the original packet transmission.

In schemes introduced with respect to FIGS. 3 and 6, preferably, a pilot can be removed from the transmission of subpacket A' in a 1xEV-DO slot. Moreover, a Medium Access Control (MAC) burst can also be removed in the 1xEV-DO slot. The removal of the pilot and the MAC burst in the RS transmission can enable backward compatibility. The pilot and the MAC burst removal is necessary to make sure that legacy MSs can estimate the correct channel quality information (CQI) which is used to generate data rate control (DRC) information. Otherwise, the legacy MSs will measure increased interference and report a lower CQI. Although it is preferable to remove the pilot from the transmission of subpacket A' in 1xEV-DO, alternatively, the pilot can also be kept in transmitting subpacket A' in a 1xEV-DO slot.

Furthermore, absent the pilot and/or the MAC burst, the MS does not falsely believe that the received signal is the original signal. In addition, the removal would help reduce interference.

Figure 7:
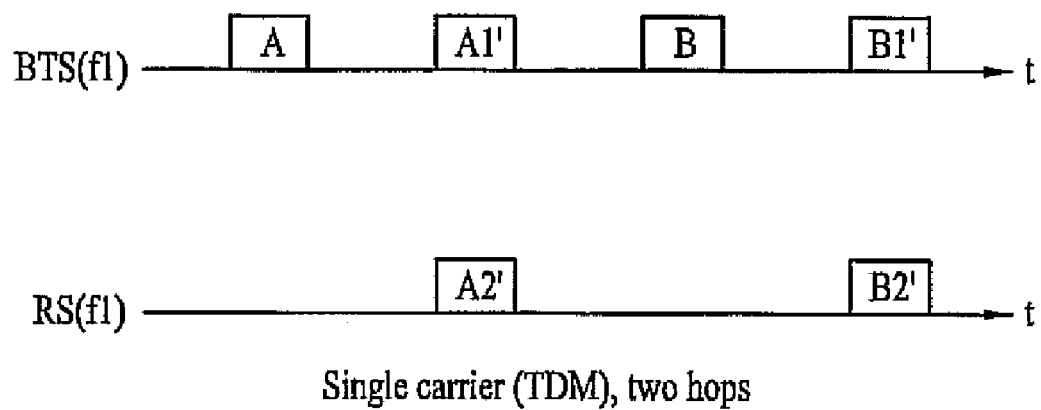
FIG. 7 illustrates a scheme for a relayed BCMCS according another embodiment of the present invention.

FIG. 7 illustrates a scheme for a relayed BCMCS according another embodiment of the present invention. In FIG. 7, a single frequency carrier having a time-division multiplexing (TDM) is applied in a multi-hop system.

Since the BTS and the MS share the same spectrum in a time division multiplexing (TDM) fashion, the transmission time for a single packet is doubled. As described above, the BTS broadcasts the original signal (i.e., subpacket A) during the first transmission time slot. The RS then receives and decodes the BTS' transmission of subpacket A. Thereafter, the RS transmits a 'relayed signal' A2' during the subsequent transmission time slot. Here, subpacket A2' can be a simple repetition of subpacket A or can be space-time encoded. Alternatively, subpacket A2' can be a simple repetition of subpacket A1' or a space-time coded version of subpacket A1'. At the same transmission time slot, the BTS retransmits subpacket A now in form of subpacket A1'. Here, subpacket A1' can be simple repetition of subpacket A, space-time encoded subpacket A, or packet(s) having different parity bits than subpacket A.

That is, there are a number of options for designing the relayed signal A2' and the BTS retransmitted signal A1'. For example, both subpacket A1' and subpacket A2' can be simple repetition where subpacket A2'=subpacket A1' or subpacket A2'=subpacket A. It is important to note that the information carried by the subpackets are the same. Alternatively, subpacket A1' and subpacket A2' can both be space-time encoded. For example, subpacket A2' can be space-time coded version of subpacket A1' while subpacket A1' is a repetition of subpacket A. Further, as another example, subpacket A1' can be different channel encoded version of subpacket A (e.g., same payload but different parity bits) while subpacket A2' can be a space-time coded version of subpacket A1' or a replica (simple repetition) of subpacket A1'.

Figure 8:
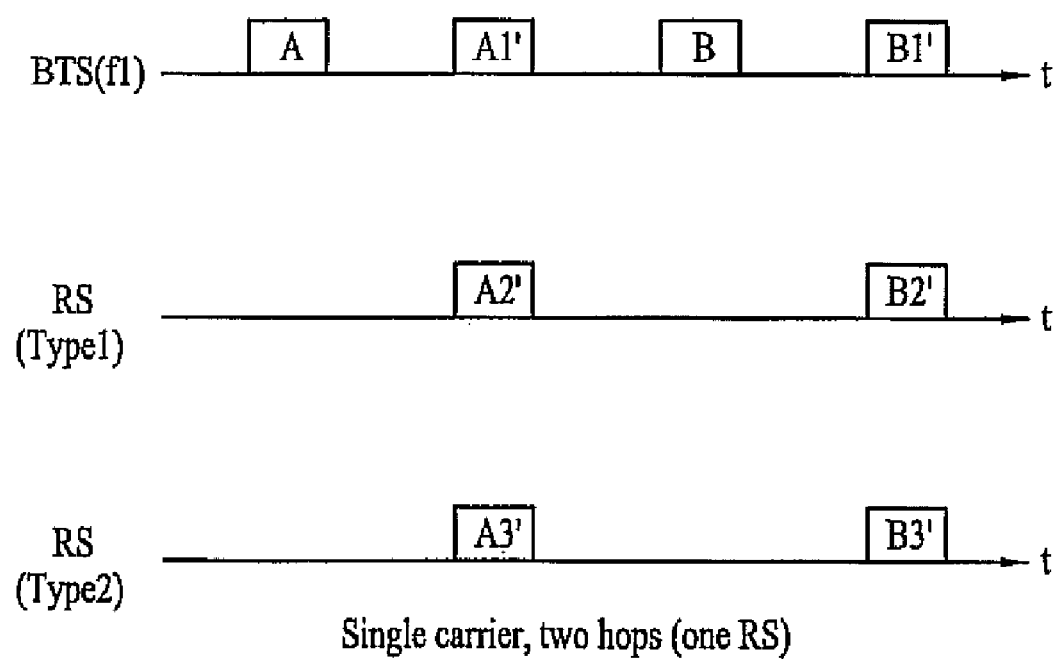
FIG. 8 illustrates a scheme for a relayed BCMCS according to another embodiment of the present invention.

Similar arrangement can be applied to subsequent BTS transmissions (e.g., packet B and packets B1'/B2'), FIG. 8 illustrates a scheme for a relayed BCMCS according to another embodiment of the present invention. In FIG. 8, a single frequency carrier is used in a multi-hop system. The BTS broadcasts subpacket A during a first transmission time slot. The RS receives the broadcasted subpacket A and decodes it. The decoded subpacket A is then transformed into subpacket A2' and subpacket A3' depending on the RS Type. As described above with respect to FIG. 4, the transmission of packets from the RSs can be divided into Type 1 and Type 2 where one type can be simple repetition. Alternatively, both types can be space-time encoded. In addition, the BTS retransmits subpacket A in a form of subpacket A1'. Here, subpacket A1' can be simple repetition of subpacket A or can be space-time encoded.

As illustrated in FIG. 8, subpacket A1', subpacket A2', and subpacket A3' are transmitted to the MS at the subsequent transmission time slot. In this transmission, for example, all packets can be simple repetition where subpacket A1'=subpacket A2'=subpacket A3'. Alternatively, all packets can be space-time encoded or a combination of simple repetition and space-time encoded packets.

Further, the transmission of the subpackets (e.g., subpacket A1', A2', and A3') can be performed in various combinations of encoded subpackets. For example, subpacket A2' and subpacket A3' can be any one of space-coded subpacket or a repeated broadcast subpacket, respectively. Moreover, subpacket A2' and subpacket A3' can have different parity bits than the retransmitted subpacket A1' or the original subpacket A.

For example, subpackets A2'=subpacket A1' and subpacket A3'=a space-time encoded version of subpacket A2' where subpacket A1' can be either a replica (e.g., simple repetition) of subpacket A or different encoded version (e.g., incremental redundancy with different parity bits). Another example is where subpackets A1', A2', and A3' can be third-order transmit diversity scheme where the three subpackets are distinct. As before, subpacket A1' can be either a replica (e.g., simple repetition) or subpacket A or a different encoded version (e.g., incremental redundancy with different parity bits.

Here, subpacket A1' is a re-transmission after subpacket A for the same payload (or packet) (where subpacket A1' can be identical to subpacket A or be different with different parity bits) from the BTS. Subpackets A2' and A3' are transmitted from a RS of Type 1 and another RS of Type 2, respectively, all in the same time slot. Here, as described in FIG. 8, the RS can be divided into two types (i.e., Type 1 and Type 2) based on the RS sharing the same frequency with the BTS and/or based on the RS having two antennas sharing the same frequency with the BTS. However, the RS is not limited to having two antennas but can have more than two antennas. As discussed above, the RS decodes the BTS' transmission of subpacket A and transmits the 'relayed signals' A2' and A3' for RS of Type 1 and RS of Type 2, respectively. For example, RS Type 1 transmits subpacket A2'=subpacket A1' and RS Type 2 transmit subpacket A3'=subpacket A1'. The subpacket can be a simple repetition of subpacket A or a differently encoded version (e.g., incremental redundancy from the same information payload.)

In another example, subpackets A1', A2', and A3' can be third-order transmit diversity scheme. In another example, subpackets A1', A1', and A3' can be a second order transmit diversity such as the Alamouti scheme. For example, subpacket A2' can be a replica of subpacket A1' and subpacket A3' can be a space-time encoded version of subpacket A1'. As before, subpacket A1' can be either a replica of subpacket A, or it can be a differently encoded version.

In addition, the packets transmitted form the RS can be independent of subpacket A1'. Typically, packets transmitted from the RS(s) are repeated or space-time coded based on the retransmitted subpacket A1'. However, the packets transmitted form the RS(s) do not necessarily have to be based on subpacket A1'. In other words, for example, if subpacket A2'=subpacket A1' (e.g., subpacket A2' is a simple repetition of subpacket A1'), subpacket A3' does not have to be dependent on or directly related to A1'. That is, subpacket A3' can be dependent from subpacket A (e.g., subpacket A3' is a simple repetition or space-time coded from subpacket A). Similarly, subpacket A3' can be associated with subpacket A1' while subpacket A2' is dependent on subpacket A, for example.

The embodiments described above can be applied to the BCMCS system to reduce coverage holes and limited capacity. In effect the embodiments of the present invention can be applied to significantly extend the BCMCS coverage and increase broadcast-multicast system capacity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving subpackets in a mobile communication system for a broadcast multicast service (BCMCS) using a single frequency carrier, the method comprising:
   receiving a first broadcast subpacket from a base station (BS) at a first time slot;
   receiving at least one subsequent broadcast subpacket of the first broadcast subpacket from the BS at a second time slot; and
   receiving at least one relayed broadcast subpacket from at least one relay station (RS) at the same time slot as the second time slot,
   wherein information of the first broadcast subpacket, the subsequent broadcast subpacket and the relayed broadcast subpacket are the same,
   wherein the at least one relayed broadcast subpacket is at least one of a space-time coded version of the first broadcast subpacket and a broadcast subpacket having different parity bits than that of the first broadcast subpacket.

2. The method of claim 1, wherein the at least one relayed broadcast subpacket has stronger signal strength than the signal strength of the first received broadcast subpacket.

3. The method of claim 1, wherein the at least one relayed broadcast subpacket is a different channel coded version of the first broadcast subpacket for incremental redundancy (IR).

4. The method of claim 1, wherein the RS has at least one antenna through which the space-time coded relayed broadcast subpacket is transmitted.

5. The method of claim 1, wherein the RS has at least one antenna through which the at least one relayed broadcast subpacket, which has stronger signal strength than the signal strength of the first received subpacket, is transmitted.

6. The method of claim 1, wherein the RS has at least one antenna through the at least one relayed broadcast subpacket having different parity bits than parity bits of the first broadcast subpacket is transmitted.

7. The method of claim 1, wherein the at least one relay station is configured to transmit a first of the at least one relayed broadcast subpacket, which is a space-time coded first broadcast subpacket, from a first RS, and a second of the at least one relayed broadcast subpacket, which is a broadcast subpacket having different parity bits than that of the first broadcast subpacket, from a second RS.

8. The method of claim 1, wherein the at least one relay station is configured to transmit:
   a first of the at least one relayed broadcast subpacket, which is space-time coded or has different parity bits than parity bits of the first broadcast subpacket, from a first RS; and
   a second of the at least one relayed broadcast subpacket, which is space-time coded or has different parity bits than parity bits of the first broadcast subpacket, from a second RS.

9. The method of claim 1, wherein the at least one relay station is configured to transmit:
   a first of the at least one relayed broadcast subpacket, which is space-time coded or has different parity bits than parity bits of the retransmitted broadcast subpacket, from a first RS; and
   a second of the at least one relayed broadcast subpacket, which is space-time coded or has different parity bits than parity bits of the retransmitted broadcast subpacket, from a second RS.

10. The method of claim 9, wherein the retransmitted broadcast subpacket is one of the subsequent broadcast subpacket, which is space-time coded or has different parity bits than parity bits of the first broadcast subpacket, transmitted from the BS.

11. The method of claim 1, wherein the at least one relay station is configured to transmit:
   a first of the at least one relayed broadcast subpacket, which is space-time coded or has different parity bits than parity bits of the retransmitted broadcast subpacket, from a first RS; and
   a second of the at least one relayed broadcast subpacket, which is space-time coded or has different parity bits than parity bits of the first broadcast subpacket, from a second RS.

12. The method of claim 11, wherein the retransmitted broadcast subpacket is one of the subsequent broadcast subpacket, which is space-time coded or has different parity bits than parity bits of the first broadcast subpacket, transmitted from the BS.

13. The method of claim 1, wherein the at least one relay station is configure to transmit:
   a first of the at least one relayed broadcast subpacket, which is space-time coded has different parity bits than parity bits of the first broadcast subpacket, from a first RS; and
   a second of the at least one relayed broadcast subpacket, which is space-time coded or has different parity bits than parity bits of the retransmitted broadcast subpacket, from a second RS.

14. The method of claim 13, wherein the retransmitted broadcast subpacket is one of the subsequent broadcast subpacket, which is space-time coded or has different parity bits than parity bits of the first broadcast subpacket, transmitted from the BS.

* * * * *